(No Model.)

L. J. SEVISON.
INSECT CATCHER AND DESTROYER.

No. 534,675. Patented Feb. 26, 1895.

Attest:
Wm. T. Hall
W. Donnelly

Inventor:
L. J. Sevison
by Ellis Spear
Atty.

THE NORRIS PETERS CO., PHOTO-LITHO., WASHINGTON, D. C.

UNITED STATES PATENT OFFICE.

LUTHER J. SEVISON, OF FLORENCE, MICHIGAN.

INSECT CATCHER AND DESTROYER.

SPECIFICATION forming part of Letters Patent No. 534,675, dated February 26, 1895.

Application filed October 17, 1894. Serial No. 526,198. (No model.)

*To all whom it may concern:*

Be it known that I, LUTHER J. SEVISON, a citizen of the United States of America, residing at Florence, in the county of St. Joseph and State of Michigan, have invented certain new and useful Improvements in Insect Catchers and Destroyers, of which the following is a specification.

My invention is a machine that has for its object the destruction of insects infesting vines of almost any description but more especially potato vines. It is designed to be drawn by horses or any mechanical means and is so constructed that the turning of the supporting wheels as the machine moves along beside the vines operates mechanism to gather the insects feeding upon the vines into a hopper containing some poisonous fluid by which the insects are killed.

The invention consists of the details of construction as will be hereinafter described and paticularly pointed out in the claims.

The invention is illustrated by the accompanying drawings, in which—

Figure 1:
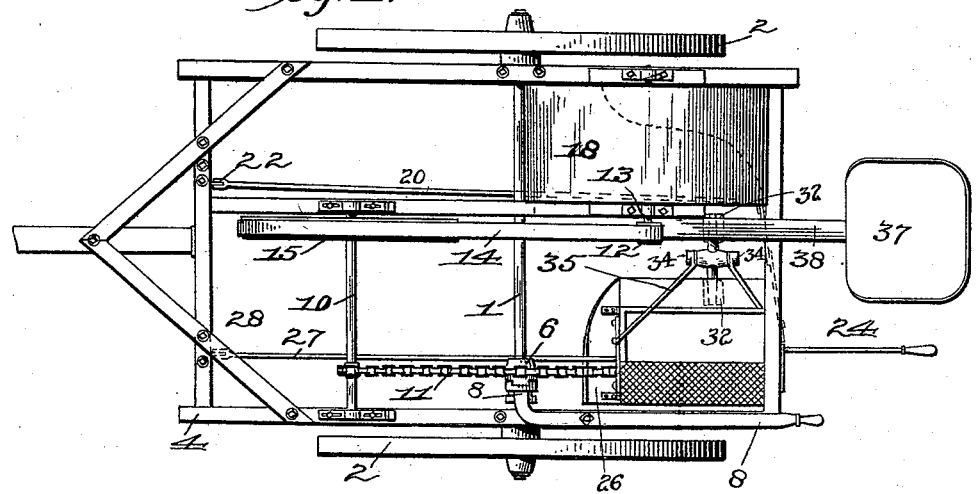
Figure 2:
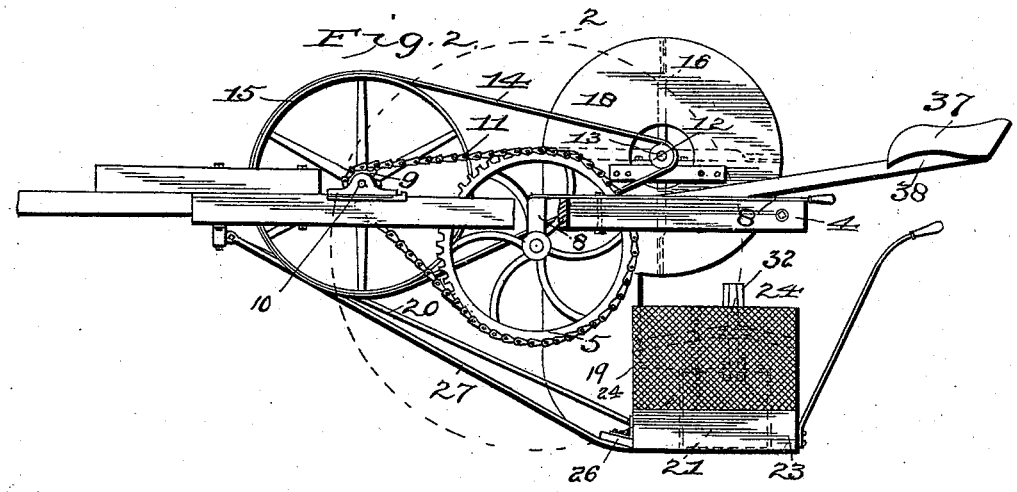
Figure 3:
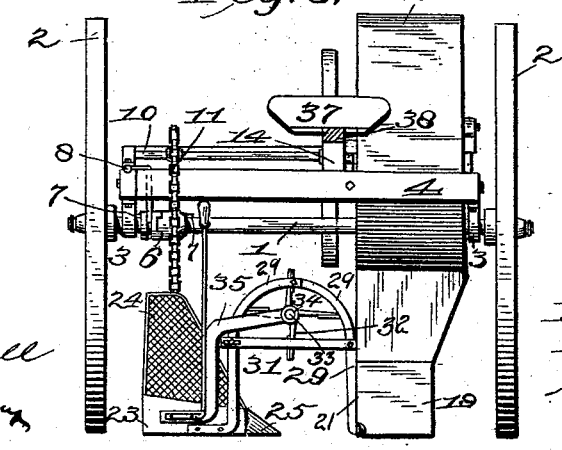

Figure 1, is a plan view; Fig. 2, a side elevation with parts removed and broken away. Fig. 3, is a rear elevation.

The machine is supported by the two side wheels 2, that also act as the main drive wheels being connected by the shaft 1 to which they are rigidly attached. The shaft 1 is journaled in bearings 3, depending from the under part of the longitudinal sides of the rectangular frame 4.

Held loosely on the shaft 1, but adapted to be rotated thereby when engaged by the clutch 6, is the driving sprocket wheel 5. The clutch 6 has longitudinal movement on the shaft 1 being held against independent rotary movement by the feather key 7. The clutch is engaged and disengaged with the sprocket wheel 5 by the lever 8 pivoted on the upper part of one of the longitudinal sides of the frame 4, said lever having a depending yoke fitting partly within a groove in the periphery of the clutch 6. The lever is moved by the operator by means of a handle extending to the rear of the machine.

In the forward part of the frame 4 is journaled the supplemental driving shaft 10 carrying the sprocket wheel 9 connected to the sprocket wheel 5 by the chain 11 and operated thereby to rotate the shaft 10. A pulley 15 also carried by this shaft is connected to the pulley 12 of much samller size by the driving belt 14. The pulley 12 is attached to and drives the shaft 13 carrying one or more fans 16 inclosed by casing 18 supported by the frame 4, and forming the blower as will be described hereinafter.

Attached to the lower end of casing 18 is a flexible spout 19 held in position by the rod 20 attached at one end to the mouth 21 of the spout and having its other end pivoted to the forward part of the frame 4 at 22. A hopper 23 of rectangular form secured opposite the mouth of the spout 19 has upwardly extending sides and back formed of wire screen 24, the top also being partly covered in the same manner.

The front of the hopper is provided with a chute 25 for gathering the insects that fall upon the ground when shaken off the vines. An upwardly projecting shoe 26 is secured to the front side of the hopper and forms a guide to enable it to ride more freely over uneven ground. The hopper is drawn forward by means of the rod 27 attached to the lower front side thereof, the opposite end of the rod being pivoted to the cross bar of the frame 4 at 28. The spout 19 of the blower is adjustably connected to the hopper 23 by the rods 29 one of said rods being secured at one end near the bottom of the rear side of the hopper and the other to the bottom of the spout. Both of the rods extend upwardly and curve over, being pivoted together thus forming a semicircle. The hopper and spout are adjusted in relation to each other by means of the slotted cross rod 31 attached at one end to one of the rods 29 and adjustable by means of a screw extending through said slot into the other rod 29.

For disturbing the vines to cause the insects to release their hold thereon, I provide a striker formed of the arms 32 carried on a shaft 33 journaled in bearings 34 in the ends of brackets 35 attached to each side of the hopper 23. The arms are rotated by means of the draft caused by the blower. A seat 37 for the operator is supported by beam 38 carried by the frame 4. A handle connected to the hopper 23 extends upwardly in proximity to the operator's seat and provides means for adjusting the hopper and spout while the machine is in motion. Crude petroleum or any liquid deadly to insects, is placed within the hopper 23 or in a drawer that may be placed therein to kill the insects as they fall after being caught by the screen 24.

It will be understood that the receptacle 23 is on one side of the vine while the blower is upon the opposite side thereof, the striker being in direct engagement therewith.

Having now described my invention, what I claim is—

1. In an insect destroyer, a frame wheel on each side thereof supporting the same, a receptacle for catching insects carried by said frame, a blower also carried by the frame and means for operating said blower whereby the insects are driven into said receptacle, substantially as described.

2. In an insect destroyer, a frame, wheels on each side thereof supporting the same, a shaft carried by said frame attached rigidly to said wheels and adapted to rotate therewith, a sprocket wheel carried loosely on said shaft, clutch mechanism operated by a pivoted lever for throwing said wheel into and out of connection with said shaft, a supplemental shaft carried by said frame, a sprocket wheel rigidly attached thereto and connected to the said sprocket wheel on the main shaft by a sprocket chain, a receptacle for catching the insects, a blower having its mouth opposite said receptacle and means whereby the rotation of the supporting wheels will rotate said sprocket wheel and operate said blower to drive said insects into said receptacle as set forth.

3. In an insect destroyer, the frame, the shaft carried thereby, the supporting wheels rigidly attached to the ends of said shaft, the sprocket wheel also on said shaft, the supplemental shaft, the sprocket wheel thereon connected to the sprocket wheel on the main shaft, a driving pulley attached to said supplemental shaft, the receptacle for catching the insects, the blower, the fan, a pulley on the end of said shaft connected to the pulley on the main shaft and a striker arranged between said catching receptacle and the blower whereby the rotation of the supporting wheels will operate the blower and the striker by said blower and drive the insects into said receptacle as set forth.

4. In an insect destroyer, the frame the receptacle having an imperforate bottom adapted to contain a fluid, the blower having a flexible spout with the mouth thereof opposite said receptacle, a striker arranged between said receptacle and blower supported by brackets on said receptacle, an adjustable connection between said blower and receptacle and means for operating said blower by the rotation of said supporting wheels, substantially as described.

5. In an insect destroyer, the frame, the wheels supporting the same, the stationary blower carried by said frame means for operating said blower, and a catching receptacle resting upon the ground, having a shoe at its forward end and connected by a pivoted rod to the forward part of said frame, substantially as described.

6. In an insect destroyer, the frame, a catching receptacle, a striker for directing the insects to the receptacle, and a blower for operating the striker, substantially as described.

In testimony whereof I affix my signature in presence of two witnesses.

LUTHER J. SEVISON.

Witnesses:
F. W. KNOWLEN,
E. L. MATER.